(12) United States Patent
Herta et al.

(10) Patent No.: US 9,975,381 B2
(45) Date of Patent: May 22, 2018

(54) PNEUMATIC VEHICLE TIRE WITH FOUR STEEL CORD BELT PLIES

(71) Applicant: Continental Reifen Deutschland GmbH, Hannover (DE)

(72) Inventors: Katie Herta, Hannover (DE); Joerg Bartke, Hannover (DE); Dong Zheng, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 734 days.

(21) Appl. No.: 14/267,334

(22) Filed: May 1, 2014

(65) Prior Publication Data

US 2014/0238573 A1    Aug. 28, 2014

Related U.S. Application Data

(63) Continuation of application No. PCT/EP2012/067901, filed on Sep. 13, 2012.

(30) Foreign Application Priority Data

Nov. 1, 2011  (DE) .......................... 10 2011 054 975

(51) Int. Cl.
*B60C 9/20* (2006.01)
*B60C 9/18* (2006.01)

(52) U.S. Cl.
CPC .............. *B60C 9/2006* (2013.01); *B60C 9/18* (2013.01); *B60C 2009/1871* (2013.01);
(Continued)

(58) Field of Classification Search
CPC ..... Y10T 152/10792; Y10T 152/10801; B60C 2009/2012; B60C 2009/2016;
(Continued)

(56) References Cited

U.S. PATENT DOCUMENTS 3,625,272 A * 12/1971 Fletcher ................... 152/534 X
3,717,191 A *  2/1973 Harrington et al. ...... 152/534 X
(Continued)

FOREIGN PATENT DOCUMENTS

DE   10 2005 057 823 A1   6/2007
DE   10 2006 020 933 A1   11/2007
(Continued)

OTHER PUBLICATIONS

English machine translation of DE 10 2005 057 823 A1, Jun. 6, 2005.*
(Continued)

*Primary Examiner* — Adrienne C Johnstone
(74) *Attorney, Agent, or Firm* — Walter Ottesen, P.A.

(57) ABSTRACT

A pneumatic vehicle tire of a radial type of construction is for heavy trucks and has a four-ply belt (3). Each belt ply (7, 8, 9, 10) contains steel cords as reinforcing elements which run parallel to one another in each belt ply. Not only are the angles ($\beta$, $\gamma$) that the steel cords in the second and third belt plies (8, 9) form with the circumferential direction (A-A) approximately equal, but also the angles ($\alpha$, $\delta$) that the steel cords in the first and fourth belt plies (7, 10) form with the circumferential direction (A-A) are likewise approximately equal.

4 Claims, 2 Drawing Sheets

(52) U.S. Cl.
CPC .............. *B60C 2009/2016* (2013.01); *B60C 2009/2019* (2013.01); *B60C 2200/06* (2013.01); *Y10T 152/10792* (2015.01); *Y10T 152/10801* (2015.01)

(58) Field of Classification Search
CPC .......... B60C 2009/2019; B60C 9/2006; B60C 2009/1871; B60C 9/185; B60C 9/1835; B60C 9/18
USPC ........................................ 152/532, 534, 535
See application file for complete search history.

(56) References Cited

U.S. PATENT DOCUMENTS 4,161,203 A * 7/1979 Suzuki ...................... 152/534 X
4,172,487 A * 10/1979 Suzuki ...................... 152/534 X
4,934,428 A * 6/1990 Aoki ............................ 152/532

FOREIGN PATENT DOCUMENTS

| DE | 102011000821 A | * | 8/2012 | |
| GB | 1 429 876 | * | 3/1976 | ........... B60C 9/2006 |
| JP | 06227210 A | * | 8/1994 | |
| JP | 07069005 A | * | 3/1995 | |
| JP | 2000-177314 A | | 6/2000 | |
| JP | 2006151212 A | * | 6/2006 | |

OTHER PUBLICATIONS

English machine translation of DE 10 2006 020 933 A1, Nov. 8, 2006.*
English machine translation of JP 2000-177314 A, Jun. 27, 2000.*
English machine translation of JP 7-69005 A, Mar. 14, 1995.*
English machine translation of JP 2006-151212 A, Jun. 15, 2006.*
English machine translation of DE 10 2011 000 821 A1, Aug. 23, 2012.*
International Search Report dated Oct. 25, 2012 of international application PCT/EP2012/067901 on which this application is based.

* cited by examiner

PNEUMATIC VEHICLE TIRE WITH FOUR STEEL CORD BELT PLIES

CROSS REFERENCE TO RELATED APPLICATIONS

This application is a continuation application of international patent application PCT/EP2012/067901, filed Sep. 13, 2012, designating the United States and claiming priority from German application 10 2011 054 975.7, filed Nov. 1, 2011, and the entire content of international patent application PCT/EP2012/067901 is incorporated herein by reference.

FIELD OF THE INVENTION

The invention relates to a pneumatic vehicle tire of a radial configuration for heavy trucks, with a four-ply belt, wherein each belt ply includes steel cords as reinforcement members, which run parallel to one another in each belt ply, the slope of the steel cords relative to the circumferential direction following a certain sequence in respect of rightward increasing and/or leftward increasing slope, starting with the first, radially innermost belt ply, and wherein the angles that the steel cords in the second and third belt plies form with the circumferential direction are approximately the same in each case.

BACKGROUND OF THE INVENTION

It is known that the design of the belt structure has a decisive influence on the abrasion pattern on undriven truck tires, especially when the latter are used in long-distance traffic including a very large proportion of straight line driving. A conventional practice is, for example, the use of a "diamond-pattern tire belt", typically including four plies, the steel cords of which form an angle of 16° to 20° with the circumferential direction of the tire and the plies of which are applied in such a manner that the steel cords cross alternately. Another typical tire belt for truck tires is the "triangular-pattern belt" including four plies, wherein the steel cords in the first, radially innermost belt ply form an angle of 50° to 65° with the circumferential direction. It is furthermore customary for the orientation of the steel cords in the individual belt plies to be designated with an R for a rightward leaning slope and with an L for a leftward leaning slope relative to the circumferential direction. A typical sequence is RRLL with an angle of 50°, for example, in the first (radially innermost) belt ply and an angle of in each case 18° in the other belt plies.

A tire of the type described above has been disclosed by DE 10 2006 020 933 A1. The reinforcement members of the first, radially innermost belt ply form an angle of 50° to 65° with the circumferential direction. The second and third belt plies have reinforcement members which each form an identical angle of from 16° to 20° with the circumferential direction. The fourth belt ply has a very large angle with respect to the circumferential direction and is between 50° and 90°, preferably between 70° and 90°. The sequence of the arrangement of the reinforcement members from the first to the fourth belt ply is RRLR. This special belt alignment ensures that shoulder abrasion is reduced and significantly slows the formation of free-wheeling grooves or tramline wear.

SUMMARY OF THE INVENTION

It is an object of the invention to provide a truck tire with a four-ply belt configured in such a manner that the disproportionate shoulder abrasion which occurs is reduced and the formation of free-wheeling grooves is significantly slowed.

This object is achieved by virtue of the fact that the angles that the steel cords in the first and fourth belt plies form with the circumferential direction are likewise approximately the same in each case.

A truck tire having a four-ply belt is provided, in which the reinforcement members of the first and fourth belt plies have approximately the same angle in relation to the circumferential direction and the reinforcement members of the second and third belt plies have approximately the same angle in relation to the circumferential direction. Here, "approximately the same angle" means that deviations of 5° may occur due to manufacture.

It has been found that truck tires having an abovementioned belt have a significantly improved abrasion pattern. In particular, there is a significantly less pronounced abrasion phenomenon in the shoulder regions, and the formation of free-wheeling grooves takes place significantly later on tires according to the invention. The reason for the achievable reduction in shoulder abrasion and the slowing of the formation of free-wheeling grooves is probably the significantly reduced deformation of the belt and thus also of the tread in the circumferential direction. The reduced deformation is likewise observable over the entire width of the belt. This reduced deformation of the belt is evident particularly in the shoulder region. This is presumably due to the fact that, with the belt structure according to the invention, the stretching required in the process of cambering during tire production takes place primarily due to a change in cord spacing and not, as in the case of prior art tires, by way of changes in cord angle in relation to the circumferential direction, which has a disadvantageous effect on stiffness and hence on tread abrasion in the finished tire.

It is advantageous if the angle that the steel cords in the second and third belt plies form with the circumferential direction is between 10° and 30°, preferably between 18° and 24°.

It is advantageous if the angle that the steel cords in the first and fourth belt plies form with the circumferential direction is between 40° and 55°, preferably between 40° and 46°. The abrasion and durability of the tire is improved and, furthermore, there is an advantageous increase in the plunger values.

The pneumatic vehicle tire can have a belt in which the slope of the steel cords relative to the circumferential direction follows the sequence RRLL (rightward increasing slope, rightward increasing slope, leftward increasing slope, leftward increasing slope), starting with the first, radially innermost belt ply. With the abovementioned slope sequence, excellent advantages are obtained. It has been found that advantages are obtained particularly with respect to abrasion.

As an alternative, the pneumatic vehicle tire can have a belt in which the slope of the steel cords relative to the circumferential direction follows the sequence RRLR (rightward increasing slope, rightward increasing slope, leftward increasing slope, rightward increasing slope), starting with the first, radially innermost belt ply.

As another alternative, the pneumatic vehicle tire can have a belt in which the slope of the steel cords relative to the circumferential direction follows the sequence RLRL (rightward increasing slope, leftward increasing slope, rightward increasing slope, leftward increasing slope), starting with the first, radially innermost belt ply.

As another alternative, the pneumatic vehicle tire can have a belt in which the slope of the steel cords relative to the circumferential direction follows the sequence LRLR (leftward increasing slope, rightward increasing slope, leftward increasing slope, rightward increasing slope), starting with the first, radially innermost belt ply.

It is practical if an additional rubber ply is arranged between the third and fourth belt plies. The thickness of the rubber ply is between 1.5 mm and 3.5 mm. It has been found that the arrangement of the abovementioned rubber ply increases the cord spacing of the fourth belt ply. There is an advantageous increase in the plunger values.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
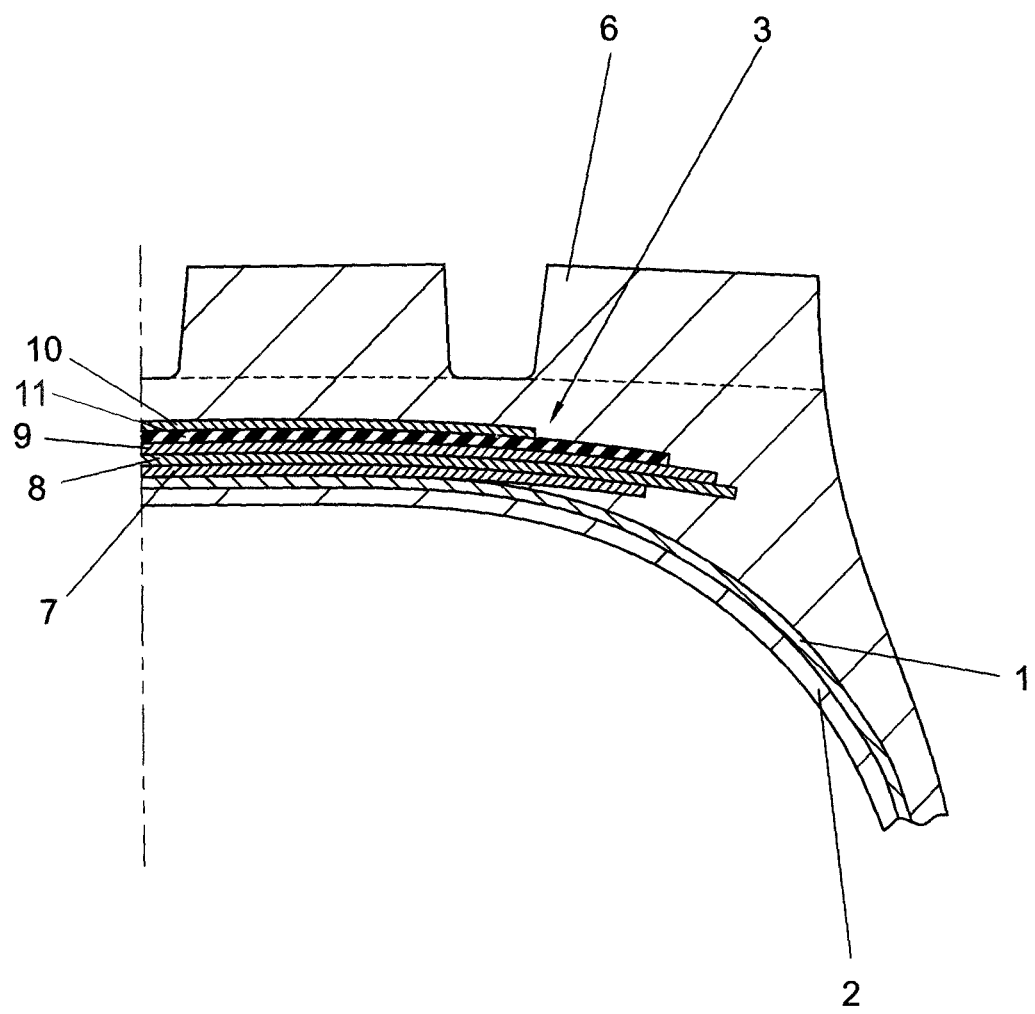
FIG. 1 shows a partial cross section through one half of a pneumatic vehicle tire in the region of the belt and of the tread; and, FIG. 2 is a plan view of an alternative embodiment of the belt plies.

FIG. 1 shows a cross section through the tread and the belt region of a pneumatic vehicle tire for trucks in a conventional standard structure having a carcass 1 including steel cords as reinforcement members, an inner layer 2 impermeable to air, a multi-ply belt 3 and a profiled tread 6.

The belt 3 has four belt plies 7, 8, 9 and 10, wherein the fourth, radially outermost belt ply 10 is the narrowest of all the plies and forms the "protective ply". The first belt ply 7 is the "barrier ply", the second belt ply 8 and the third belt ply 9 are the "working plies". The widest belt ply is the second belt ply 8, which thus overlaps the first belt ply 7 completely. The third belt ply 9 is somewhat wider than or the same width as the first belt ply 7. The fourth belt ply 10 can furthermore be embodied so as to have the same width as the third belt ply 9. An additional rubber ply 11 may be arranged between the third belt ply 9 and the fourth belt ply 10.

All the belt plies (7, 8, 9, 10) include reinforcement members which are embedded in a rubber compound, the belt rubber, and are made from steel cord, for example steel cord with a 3×0.2 mm+6×0.35 mm structure. Of course, it is also possible for steel cords with a different structure to be used in the belt plies.

Figure 2:
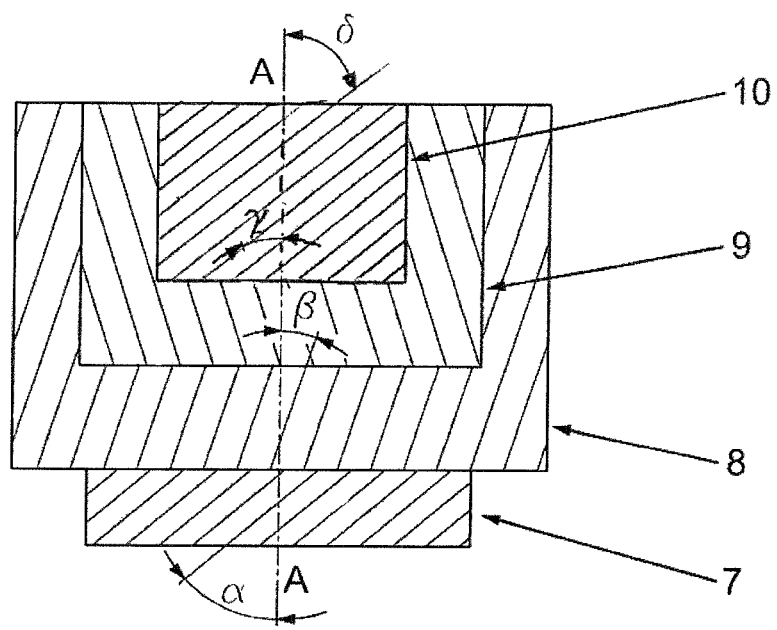

As FIG. 2 shows, the steel cords in each of the plies 7, 8, 9 and 10 run parallel to one another and form respective angles $\alpha$, $\beta$, $\gamma$ and $\delta$ with the circumferential direction of the tire indicated by the line A-A. The slope of the steel cords relative to the circumferential direction in the individual belt plies (7, 8, 9, 10) is such that, starting with the radially innermost belt ply 7, the sequence for the four plies is RRLR (rightward slope, rightward slope, leftward slope, rightward slope). In the case of a four-ply belt configured in accordance with the invention, the steel cords in the first, second and fourth belt plies 7, 8 and 10 thus slope to the right in relation to the circumferential direction A-A. The angle $\alpha$ and the angle $\delta$ formed by the steel cords of the first belt ply 7 and the fourth belt ply 10 with the circumferential direction A-A is approximately the same and is between 40° and 55° or, in an alternative embodiment, between 40° and 46°, for example 40°. The angle $\beta$ and the angle $\gamma$ formed by the steel cords in the second belt ply 8 and the third belt ply 9 with the circumferential direction A-A is likewise approximately the same and lies between 10° and 30°.

For tires configured in accordance with the invention, the angles $\alpha$, $\beta$, $\gamma$ and $\delta$ in the individual belt plies 7, 8, 9 and 10 can, for example, be as follows:

$\alpha=50°$, $\beta=18°$, $\gamma=18°$, $\delta=50°$ or
$\alpha=50°$, $\beta=24°$, $\gamma=24°$, $\delta=50°$ or
$\alpha=46°$, $\beta=18°$, $\gamma=18°$, $\delta=46°$.

Radial truck tires having steel cords angled in accordance with the invention in the belt plies have a significantly improved abrasion pattern in the shoulder regions, especially when they are used on the front axle of trailers or on the drive axle of wide base tires or low aspect ratio tires, and free-wheeling grooves occur significantly later, after a higher mileage, than with tires that have steel cords at conventional angles in the belt plies.

"Low aspect ratio tires" refers to tires with an aspect ratio<50%.

It is understood that the foregoing description is that of the preferred embodiments of the invention and that various changes and modifications may be made thereto without departing from the spirit and scope of the invention as defined in the appended claims.

LIST OF REFERENCE NUMERALS (PART OF THE DESCRIPTION)

1 Carcass
2 Inner layer
3 Belt
6 Tread
7 Belt ply
8 Belt ply
9 Belt ply
10 Belt ply
11 Rubber Ply

What is claimed is:

1. A pneumatic vehicle tire having a radial configuration for heavy trucks and defining a circumferential direction A-A, the pneumatic vehicle tire comprising:

a four ply belt having a radially innermost first belt ply, a second belt ply, a third belt ply, and a fourth belt ply;

a rubber ply arranged between said third belt ply and said fourth belt ply;

said first, second, third, and fourth belt ply each including steel cords configured as reinforcement members;

said steel cords of each of said first belt ply, said second belt ply, said third belt ply, and said fourth belt ply running parallel to the other steel cords of the same belt ply;

said steel cords of said first, second, third, and fourth belt plies having a predetermined slope sequence of rightward increasing (R) and leftward increasing (L) slope with respect to the circumferential direction A-A starting with said steel cords of said radially innermost first belt ply;

said steel cords of said second belt ply enclosing an angle $\beta$ with the circumferential direction A-A;

said steel cords of said third belt ply enclosing an angle $\gamma$ with the circumferential direction A-A;

said angle $\beta$ and said angle $\gamma$ being equal;

said steel cords of said first belt ply enclosing an angle $\alpha$ with the circumferential direction A-A;

said steel cords of said fourth belt ply enclosing an angle $\delta$ with the circumferential direction A-A;

said angle $\alpha$ and said angle $\delta$ being equal;

wherein said rubber ply has a thickness in the range of 1.5 mm to 3.5 mm;
wherein said angle α and said angle δ are 40°; and
wherein said angle β and said angle γ are 24°.

2. The pneumatic vehicle tire of claim 1, wherein:
said steel cords of said first belt ply and said second belt ply have a rightward increasing slope with respect to the circumferential direction A-A; and,
said steel cords of said third belt ply and said fourth belt ply have a leftward increasing slope with respect to the circumferential direction A-A.

3. The pneumatic vehicle tire of claim 1, wherein:
said steel cords of said first belt ply, said second belt ply and said fourth belt ply have a rightward increasing slope with respect to the circumferential direction A-A; and,
said steel cords of said third belt ply have a leftward increasing slope with respect to the circumferential direction A-A.

4. The pneumatic vehicle tire of claim 1, wherein:
said steel cords of said first belt ply and said third belt ply have a rightward increasing slope with respect to the circumferential direction A-A; and,
said steel cords of said second belt ply and said fourth belt ply have a leftward increasing slope with respect to the circumferential direction A-A.

* * * * *